(12) United States Patent
Thumrugoti

(10) Patent No.: US 7,444,223 B2
(45) Date of Patent: Oct. 28, 2008

(54) SKID AND ROLL-OVER PROTECTION SYSTEM AND METHOD FOR VEHICLES

(75) Inventor: Sreekanth Thumrugoti, Hyderabad (IN)

(73) Assignee: Dcrypt Consultancy Services Limited, Begumpet (IN)

( * ) Notice: Subject to any disclaimer, the term of this patent is extended or adjusted under 35 U.S.C. 154(b) by 306 days.

(21) Appl. No.: 11/419,115

(22) Filed: May 18, 2006

(65) Prior Publication Data
US 2006/0265114 A1 Nov. 23, 2006

Related U.S. Application Data

(60) Provisional application No. 60/682,538, filed on May 19, 2005.

(51) Int. Cl.
*B60B 39/00* (2006.01)

(52) U.S. Cl. .................. 701/71; 701/78; 701/37

(58) Field of Classification Search .................. 701/36, 701/38, 37, 70, 71, 72, 78
See application file for complete search history.

(56) References Cited

U.S. PATENT DOCUMENTS

| | | | |
|---|---|---|---|
| 7,032,436 B2 * | 4/2006 | Yokota et al. .................. 73/105 |
| 7,103,460 B1 * | 9/2006 | Breed .......................... 701/29 |
| 7,194,383 B2 * | 3/2007 | Clarke et al. ................. 702/183 |
| 7,225,108 B2 * | 5/2007 | Clarke et al. ................. 702/183 |

* cited by examiner

*Primary Examiner*—Richard M. Camby
(74) *Attorney, Agent, or Firm*—Mark M. Friedman

(57) ABSTRACT

A system (10) for preventing skidding or roll-over of a road vehicle includes a wheel vibratory sensor arrangement (14) for each wheel (12) configured to measure vibrational motion of the wheel hub along at least two, and preferably three, perpendicular axes. The system processes the vibrational motion measurements to determine a current status of vehicle function and implements a suitable driving correction regime when necessary. The driving correction regime may include operating a braking system (20) of the vehicle so as to apply braking to selected wheels of the vehicle.

15 Claims, 6 Drawing Sheets

FIG. 5A

| # | WHICH WHEELS | κ | τ | DIAGNOSIS | ACTION |
|---|---|---|---|---|---|
| 1 | All wheels | -1 | -1 | Tire-road traction diminished due to slippery conditions – risk of skidding. | Actuate braking and/or reduce engine torque until normal values restored. |
| 2 | All wheels | -2 | -2 | Severe loss of traction – imminent risk of hydroplaning. | Situation normally prevented by (1) – reduce speed. |
| 3 | First side Second side | +1 -1 | -1 +1 | Deteriorating stability during turn to second side. | Actuate braking and/or reduce engine torque until normal values restored. |
| 4 | First side Second side | +1 -1 | -1 +1 | Severe instability – imminent risk of roll over. | Situation normally prevented by (3) – reduce speed. |
| 5 | Front Back | +1/0 -1/0 | -1/0 +1/0 | (High frequency oscillation) – normal ABS operation. | No action required. |
| 6 | Front Back | 0 -2/0 | -2/0 0 | (High frequency oscillation) – brakes are fading. | Driver message for urgent servicing of brakes. |
| 7 | One or more Others | 0 0 | +2 0 | Selected tire(s) over inflated and subject to excess wear. | Driver message to check air pressure. Vehicle speed reduced by braking to "safe speed" until corrected. |
| 8 | One or more Others | -1/-2 0 | +1/+2 0 | Extreme over-inflation of selected tire(s) leading to very rapid wear. | Driver message to check air pressure urgently. Vehicle speed reduced by braking to "safe speed" until corrected. |
| 9 | One or more Others | +1/+2 0 | -1/-2 0 | Dangerous under-inflation of selected tire(s) leading to very rapid wear. | Driver message to check air pressure urgently. |
| 10 | One or more Others | +2 0 | -2 0 | Flat tire | Driver message. |

FIG. 5B

| # | WHICH WHEELS | κ | τ | DIAGNOSIS | ACTION |
|---|---|---|---|---|---|
| 11 | One or more Others | +2 0 | 0 0 | Wheel misalignment | Driver message to get alignment checked. Vehicle speed reduced by braking to "safe speed" until corrected. |
| 12 | One or more Others | -1 0 | +1 0 | (Intermittent) - deterioration of shock absorbers or struts of selected tire(s) resulting in excessive load transfers from side-to-side and front-to-back. | Driver message to check suspension of specific wheel(s). Vehicle speed reduced by braking to "safe speed" until corrected. |
| 13 | One or more Others | -2 0 | +2 0 | (Intermittent) – severe deterioration of shock absorbers or struts of selected tire(s) resulting in excessive load transfers from side-to-side and front-to-back. | Driver message to check suspension of specific wheel(s). Vehicle speed drastically reduced by braking to "safe speed" until corrected. |
| 14 | Front Back | +2 -2 | -2 +2 | "Over steer" - Inertia causing excessive shift in vehicle's CG. Stability deteriorating dangerously | Reduce rear wheel spin till curvature and torsion regain normal values during acceleration and increase driving force of the engine during braking operation. Increases road holding capability of vehicle and ultimately its safe operation. |
| 15 | Front Back | -1 +2 | +1 -2 | "Under steer" - Vehicle turning circle is increasing more rapidly than the expectation of the driver. | Reduces wheel spin of front wheels to increase their traction. |

FIG. 5C

| # | WHICH WHEELS | κ | τ | DIAGNOSIS | ACTION |
|---|---|---|---|---|---|
| 16 | First side Second side | +2 0 | +2 0 | (Variable) Road on one side is very rough. | Reduce speed by application of brakes till normalcy is restored. |
| 17 | First side Second side | +2 0 | +2 0 | (Constant) Over-inflation and misalignment | Driver message to get alignment/pressure checked. Vehicle speed reduced by braking to "safe speed" until corrected. |
| 18 | One or more Others | +1 0 | 0 0 | Walls of selected tire(s) are thinned. | Driver message to get selected tire(s) checked. Vehicle speed reduced by braking to "safe speed" until corrected. |
| 19 | One or more Others | +2 0 | 0 0 | Walls of selected tire(s) are dangerously thinned. | Driver message to get selected tire(s) checked. Vehicle speed reduced severely by braking to "safe speed" until corrected. |

SKID AND ROLL-OVER PROTECTION SYSTEM AND METHOD FOR VEHICLES

This application benefits from the filing date of U.S. Provisional Patent Application No. 60/682,538, filed May 19, 2005.

FIELD AND BACKGROUND OF THE INVENTION

The present invention relates to vehicle safety and, in particular, it concerns a system for helping to prevent skid and roll-over of road vehicles.

Speed of vehicles is increasing along with development of automobile technology and speeding is one of the most prevalent factors contributing to traffic crashes. According to National Highway Traffic Safety Administration (USA) the economic cost to society of speeding related crashes is estimated to be $40.2 billion per year in USA alone. In the year 2004, speeding was identified as a contributory factor in 30% of all fatal crashes and 13,192 lives were lost. Speeding crashes occur when an automobile is driven too fast for the prevalent conditions, more so during winters and on wet/snowy/icy road conditions.

Rollovers are another area of concern, more so due to the rapid growth of sport-utility vehicles (SUVs) in the passenger vehicle segment. According to National Highway Traffic Safety Administration (USA) research note issued in November 2005, 10,553 fatalities occurred due to passenger vehicle rollovers during the year 2004 in USA alone. SUVs, a rapidly growing segment in passenger vehicles, have the highest rate of rollovers. In some of the vehicles, even when they are equipped with ABS and stability control systems, the percentage chance of rollover is as high as 17%.

Two technologies which have been widely adopted in an attempt to improve vehicle controllability are the "anti-locking braking system" ("ABS") and the "electronic stability control" ("ESC") system.

ABS (anti-locking braking system) is a computerized system that keeps wheels from locking up during hard brake applications. ABS does not decrease or increase normal braking capability. It also does not necessarily shorten stopping distance, but it helps keeping vehicle under control during hard braking.

ESC (Electronic stability control system) compares the driver's intended direction in steering and braking inputs, to the vehicle's response, via lateral acceleration, rotation (yaw) and individual wheel speeds. ESC then brakes individual front or rear wheels and/or reduces excess engine power as needed to help correct understeer (plowing) or oversteer (fishtailing). ESC also integrates all-speed traction control, which senses drive-wheel slip under acceleration and individually brakes the slipping wheel or wheels, and/or reduces excess engine power, until control is regained. ESC cannot override a car's physical limits. If a driver pushes the possibilities of the car's chassis and ESC too far, ESC cannot prevent a crash. It is a tool to help the driver maintain control.

ESC combines ABS, traction control and yaw control (yaw is spin around a vertical axis). To grasp how it works, think of steering a canoe. If you want the canoe to turn or rotate to the right, you plant the paddle in the water on the right to provide a braking moment on the right side. The canoe pivots or rotates to the right. ESC fundamentally does the same to assist the driver.

Numerous international studies have confirmed the effectiveness of ESC in helping the driver maintain control of the car, help save lives and reduce the severity of crashes. In the fall of 2004 in the U.S., the NHTSA confirmed the international studies, releasing results of a field study in the U.S. of ESC effectiveness. NHTSA concluded that ESC reduces crashes by 35%.

Despite ABS, ESC and traction control systems, an unacceptable number of speeding accidents occur as the drivers push the car too far beyond a threshold point. This threshold point is dynamic as it is defined by the automobile, weather and road conditions and very few experienced drivers can judge this accurately.

It has been proposed to measure vibrations of wheels during operation of a vehicle in order to provide diagnostic information. For example, vibrations at the rate of rotation of the wheel may indicate an imbalance of the wheel. Vibrations at twice that frequency may indicate wear in the CV joint. Vibrations at other frequencies may indicate misfiring of an engine cylinder or the like. A sudden reduction in vibrations may indicate aquaplaning.

Although in principle, the idea of measuring vibrations is promising, the simplistic approach mentioned above is ineffective for deriving reliable information about the interaction of a vehicle with the road. Many different factors may cause variations in the frequency and amplitude of wheel vibrations, including variations in road surface, loading of the vehicle, shift of center of gravity during acceleration or braking. Simple one-dimensional vibration measurements are unable to distinguish between these different causes.

In the field of vector calculus, various parameters may be used to quantify properties of a motion. Of particular relevance to the present invention are vector curvature and vector torsion. Expressed in terms of a point moving with velocity v and acceleration a in three dimensions, the vector curvature is defined by:

$$\kappa' = \frac{|\vec{v} \times \vec{a}|}{|\vec{v}|^3}$$

and gives a measure of how sharply the path of the point turns in three dimensional space. The vector curvature becomes zero if the acceleration is along the line of the velocity. The vector torsion is defined by:

$$\tau = \frac{(\vec{v} \times \vec{a}) \cdot \vec{a}'}{\|\vec{a} \times \vec{a}'\|^2}$$

where a' is the time derivative of the acceleration. The vector torsion is a measure of the helical progression of the motion in three dimensions, and is zero for any path contained in a plane. Parenthetically, it will be noted that both the curvature and the torsion are scalar quantities. They are referred to herein as "vector curvature" and "vector torsion" to identify them as the quantities of curvature and torsion defined in vector calculus, as distinct from other common uses of the terms "curvature" and "torsion".

There is therefore a need for a system and method based on wheel vibration measurements which would reliably detect impending likelihood of skid or roll-over of a vehicle and would advise or automatically implement preventative correction.

SUMMARY OF THE INVENTION

The present invention provides a system and method which measure and interpret wheel vibrations in two or three dimensions to predict imminent loss in vehicle's road holding capability and preferably appropriately reduces its speed by selective individual wheel braking, thus ensuring stability of an automobile at all times under all automobile, road and weather conditions. The system may include a simulator/diagnostic program that assists manufacturers and testing agencies in enhancing automobile stability through better design and evaluating vehicle dynamics. The system may detect and store faults in tires, wheel alignment, castor camber, brakes or steering linkage at their onset, prompting service center personnel to take necessary action.

According to the teachings of the present invention there is provided, a method for preventing skidding or roll-over of a road vehicle having at least four wheels during operation of the vehicle, the method comprising: (a) repeatedly measuring wheel-hub vibrational motion at the hub of each of at least four of the wheels; (b) processing the vibrational motion measurements to determine a current status of vehicle function; and (c) implementing a driving correction regime according to the current status of vehicle function, wherein the measuring and the processing measure and process the vibrational motion for each wheel along at least two perpendicular axes.

According to a further feature of the present invention, the vibrational motion is measured along three perpendicular axes.

According to a further feature of the present invention, the processing includes: (a) processing the vibrational motion measurements along each of the at least two axes for each wheel to derive, substantially in real time, at least one motion-related parameter for each wheel; and (b) applying classification criteria to values of the at least one motion-related parameter for all of the wheels to identify a current status of vehicle function.

According to a further feature of the present invention, the at least one motion-related parameter for each wheel includes a parameter which varies as a function of a balance between vertical vibrations and horizontal vibrations of the wheel hub.

According to a further feature of the present invention, the at least one motion-related parameter for each wheel includes a proportional deviation of the vector curvature of the wheel-hub vibrational motion.

According to a further feature of the present invention, the proportional change is evaluated relative to an average value of vector curvature.

According to a further feature of the present invention, the at least one motion-related parameter for each wheel includes a proportional deviation of the vector torsion of the wheel-hub vibrational motion.

According to a further feature of the present invention, the proportional change is evaluated relative to an average value of vector torsion.

According to a further feature of the present invention, the at least one motion-related parameter for each wheel includes: (a) a proportional deviation of the vector curvature of the wheel-hub vibrational motion; and (b) a proportional deviation of the vector torsion of the wheel-hub vibrational motion.

According to a further feature of the present invention, the proportional changes are evaluated relative to an average value for each of the vector curvature and the vector torsion.

According to a further feature of the present invention, the classification criteria include applying both an upper threshold and a lower threshold to the at least one motion-related parameter for each wheel.

According to a further feature of the present invention, the driving correction regime includes automatic application of braking to selected wheels in order to return the current status of vehicle function to within predetermined limits.

There is also provided according to the teachings of the present invention, a system for preventing skidding or roll-over of a road vehicle having at least four wheels during operation of the vehicle, the system comprising: (a) a wheel vibratory sensor arrangement associated with each of at least four of the wheels, the wheel vibratory sensor arrangement being configured to measure vibrational motion of the hub of each wheel along at least two perpendicular axes; (b) a processing system in data communication with each of the wheel vibratory sensor arrangements, the processing system being configured to process the vibrational motion measurements to determine a current status of vehicle function; and (c) a driving correction system associated with the processing system and responsive to the current status of vehicle function to implement a driving correction regime.

According to a further feature of the present invention, the wheel vibratory motion sensor arrangement includes a tri-axial accelerometer associated with each of the at least four wheels and deployed for measuring vibrational motion of the hub of each wheel along three perpendicular axes.

According to a further feature of the present invention, the driving correction system is associated with a brake system of the vehicle and is operative to apply braking to selected wheels of the vehicle.

BRIEF DESCRIPTION OF THE DRAWINGS

The invention is herein described, by way of example only, with reference to the accompanying drawings, wherein:

FIGS. 5A-5C are parts of a table presenting a range of different vehicle malfunctions which can be identified according to an exemplary implementation of the present invention, and the corrective action taken by the system.

DESCRIPTION OF THE PREFERRED EMBODIMENTS

Figure 1:
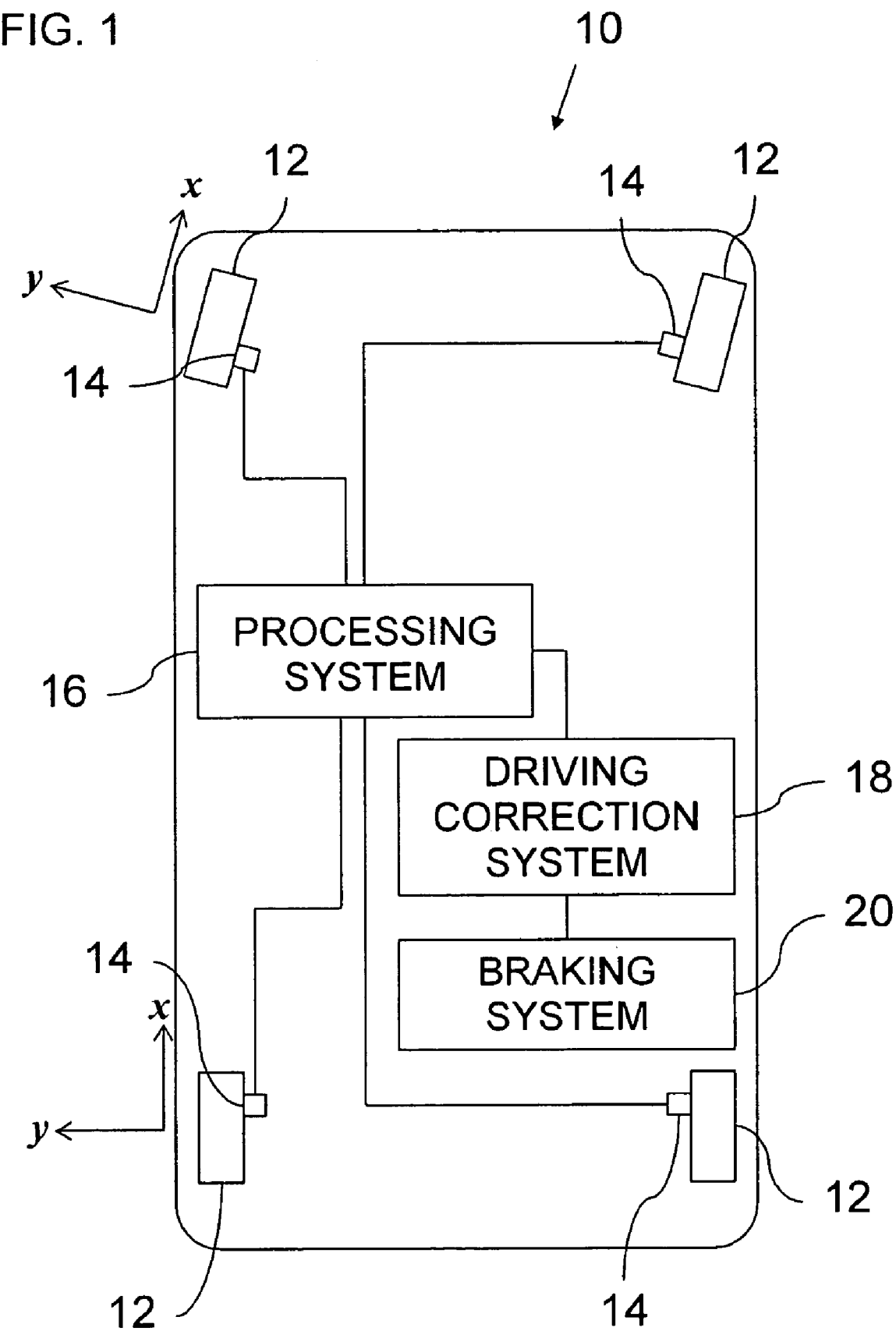
FIG. 1 is a schematic representation of a system, constructed and operative according to the teachings of the present invention, for preventing skidding or roll-over of a road vehicle, the system being shown in the context of a plan view of a vehicle.

The present invention is a system and method for preventing skidding or roll-over of a road vehicle.

The principles and operation of systems and methods according to the present invention may be better understood with reference to the drawings and the accompanying description.

Before referring to the drawings, by way of introduction, the underlying concept of the present invention relates to monitoring a balance between vibrational motion of the vehicle wheels in at least two, and preferably three, dimensions. Most, if not all, of the friction between a tire and a typical road has nothing to do with attractive intermolecular forces between the tire rubber and the road material. Instead, by a mechanism dubbed bulk friction, the rubber of a moving tire briefly presses down into small pits in the road surface. As those ups and downs of road topography jostle the tire, they cause vibrations. Reduction in road friction results in corresponding reduction in the vibrations.

Many factors influence the dynamics of wheel vibrations. These include mechanical factors such as tire loading, tire balance, defective or worn tire construction, bent wheels or axles, warped brake-drum or rotor, worn or loose universal joints, and worn shock absorbers. Other factors relate to the driving conditions, such as variations in the road surface, or shift in loading during acceleration, braking or cornering.

The suspension system of a road vehicle accommodates vertical vibrations, with a result that the amplitude of vertical vibrations tends to be much larger than horizontal (forward/back and sideways) vibrations. For this reason, horizontal vibrations are often dismissed as insignificant. To the best of the inventor's knowledge, three-dimensional wheel vibration measurements have previously been used only for assessing passenger comfort with the focus on ways and means to reduce vibrations and enhance passenger comfort.

In contrast to this approach, the present invention teaches that the measurement of wheel hub vibrations along at least two, and preferably three, axes, provides additional information vital for distinguishing between different scenarios during operation of the vehicle and to measure, indirectly, how the road holding capability of the vehicle is changing. Although the vibrations in the forward/back and sideways directions are of much smaller amplitude than those in the vertical direction, their velocity and acceleration are not necessarily smaller, and may often be of roughly the same order of magnitude as the vertical vibrations.

There follows an attempt to describe the balance between the vertical and horizontal vibrations of a vehicle wheel in simple intuitive terms. This explanation is presented as an aid to the reader and is believed to be helpful to an understanding of the operation of the present invention. However, it should be noted that the present invention as defined in the appended claims has been found experimentally to be effective, and that its patentability is not in any way conditional upon the accuracy of the theory set out below, which may well be overly simplistic.

When there is normal pressure on the wheels, vertical vibrations will be more pronounced than lateral. As the load increases, there will be much less leeway for the tires to undergo vertical vibrations. The heavier load thus reduces the vertical displacement length. It also varies the tire geometry to make the contact region larger. The extra force generated by the pits and projections of the road hitting the tire with more impact due to increase in the tire load results not only increased heat but also an increase in lateral vibrations. Hence we can conclude that load increases are followed by decrease in vertical vibrations and increase in horizontal vibrations. Vice versa is true on the wheels where there is a decrease in load.

During cornering, the load of the vehicle shifts onto the outside wheels, and load is reduced on the inside wheels. During braking, load moves onto the front wheels and is reduced on the rear wheels. Conversely, during acceleration, more load is transferred to the rear wheels. If follows that, by monitoring the varying balance of horizontal and vertical vibrations for each wheel, these different scenarios can be identified and monitored to ensure that they remain within safe limits.

When either the road or the tires become too smooth, the road holding capabilities will be significantly reduced. When vehicles travel on an icy road, ice melts and forms a watery barrier between wheels and road and stops pits and projections of the road from hitting tires. Hence the road friction is reduced. At the same time vibrations are also reduced. Hence, monitoring of the balance of vibrations can also provide an indication of the sufficiency of traction during driving.

It follows that monitoring of the relative balance between horizontal and vertical vibrations for each of the wheels of a road vehicle can provide information regarding the current level of general traction, and about whether vehicle maneuvers are bringing the vehicle close to its limits of safe operation under current conditions. By dynamically calculating a threshold point which inherently takes into consideration automobile, road and weather conditions and by reducing speed to keep the vehicle under this point all the times, the present invention enables the average driver to drive a vehicle safely under almost any circumstances, without requiring exceptional driving skills. Additionally, certain variations of parameters for individual or groups of wheels not matching the aforementioned situations of acceleration, braking or cornering may be used to indicate various malfunctions or servicing requirements.

Turning now to the drawings, FIG. 1 shows a schematic representation of a system, generally designated 10, constructed and operative according to the teachings of the present invention, for preventing skidding or roll-over of a road vehicle having four or more wheels 12 during operation of the vehicle. Generally speaking, system 10 includes a wheel vibratory sensor arrangement 14 associated with each of at least four wheels 12. Each wheel vibratory sensor arrangement 14 is configured to measure vibrational motion of the hub of the corresponding wheel 12 along at least two, and preferably three, perpendicular axes. System 10 further includes a processing system 16, in data communication with each sensor arrangement 14, configured to process the vibrational motion measurements to determine a current status of vehicle function. A driving correction system 18 is responsive to the current status of vehicle function to implement a driving correction regime, which may include operating a brake system 20 of the vehicle to as to apply braking to selected wheels of the vehicle.

At this stage, it will already be clear that system 10 as described differs considerably from existing ESC or other active safety systems in that it samples vibrational displacements of the individual wheels in at least two, and preferably three, dimensions to provide the input data from which a driving correction regime is deduced. Various options for how this input data is processed to determine the required driving correction regime will be discussed in detail below.

Figure 2:
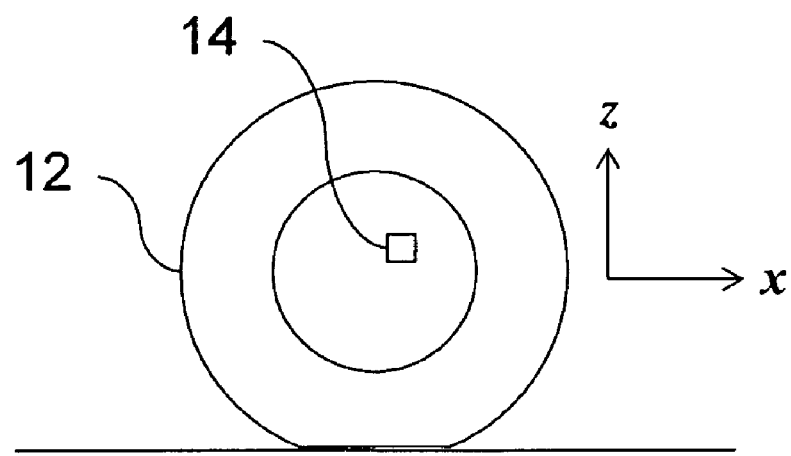
FIG. 2 is a schematic side view of a wheel illustrating conventions used herein for describing axes of motion.

At this point, it will be useful to define certain terminology as used in the description and claims. Firstly, with regard to the conventions used herein for defining directions of motion, reference is made to a set of orthogonal axes (x, y, z) defined individually for each wheel, wherein the x-axis corresponds to the "forward" direction of the wheel, the z-axis is upwards, and the y-axis completes the set of right-handed coordinates, pointing leftwards along the wheel axis of rotation. The "x" and "y" directions for two wheels are visible in FIG. 1 while the "x" and "z" directions are visible in FIG. 2. Most preferably, these directions are chosen to be the axes of measurement of the vibratory sensor arrangement 14 associated with each wheel, although the preferred implementations of the data processing described below are essentially unchanged if the measurement axes are chosen differently.

The phrase "measuring wheel-hub vibrational motion" and similar phrases are used herein in the description and claims to refer to measurement of any one or more of displacement, velocity, acceleration and rate-of-change of acceleration. As is well known in the art, in principle, measurement of any one of the aforementioned parameters allows derivation of all of the other motion parameters listed. In fact, many commercially available accelerometers are configured or configurable to provide direct outputs indicative of most or all of the aforementioned parameters.

The terms "vibration", "vibrational motion" and "vibratory" are all used herein in the description and claims to refer to perturbations from a mean position after disregarding any uniform (mean) velocity component. In other words, all measurements for each wheel are taken in a frame of reference moving with that wheel and centered at the mean position of a reference point on the wheel hub at which the sensor(s) is attached.

The phrase "driving correction regime" is used herein in the description and claims to refer to action taken by the system to address a potentially hazardous situation identified by system 10. Depending on the desired implementation, this corrective action may be in the form of a warning message (audio and/or visual) provided to the driver with recommendations for corrective action, or may include automated intervention in operation of the vehicle such as involuntary application of brakes, as will be described below.

Turning now to the structural details of wheel vibratory sensor arrangements 14, these may be any type of motion sensor capable of measuring one or more of the parameters of vibrational motion of the wheels during operation of the vehicle. The most practical implementation currently known to the inventor is the use of one or more accelerometer rigidly mounted on the central hub of the wheel via a bracket which stabilizes the sensor in a constant orientation. Ideally, the accelerometers are mounted close to the center points of the wheel hubs, although this is not essential, and may not be possible due to structural considerations in many vehicles. In some cases, it is possible to achieve useful results by mounting the sensor on a non-rotating part of the wheel suspension adjacent to the wheel, thereby simplifying the mounting.

While two or three separate uniaxial accelerometers may be used, the implementation is simplified by the use of a single triaxial sensor unit, i.e., which generates data regarding three orthogonal axes. Various types of accelerometer technology are suitable for implementing the present invention. By way of a non-limiting example, successful trials were performed using a miniature triaxial accelerometer based on piezoelectric sensor technology. Examples of suitable sensors are commercially available from Brüel & Kjær (Denmark) under the trademark DELTATRON®. Alternative implementation may use commercially available inertial sensor based on MEMS technology.

In the trials, a broad-band response accelerometer was used which was sensitive to vibrations in a frequency range from 0.3 Hz through to 3 kHz, although a significantly narrower range may be used. The frequency of data sampling is preferably at least 10 per second, and more preferably at least 100 data sampling points per second. A particularly preferred range is between about 200 to about 800 Hz sampling frequency, depending upon the technical capabilities of the sensor and of the data processing system. This high-frequency repeated sampling of data provides highly effective continuous real-time monitoring of the vehicle performance and immediate corrective action at the vehicle approaches a potentially hazardous state before the situation becomes dangerous, thereby potentially averting many vehicle accidents.

Optionally, if the quantity of data sampled is beyond the capabilities of processing system 16 for processing in real-time, data culling may be implemented. For example, according to one preferred option, since the negative parts of the x, y and z oscillations tend to closely mirror their corresponding positive vibration paths, the system may disregard sampled data with negative values of x, y and z, instead processing only the readings with positive "x", positive "y" and positive "z".

In order to normalize the data sampling, a predefined data capturing point ("DCP") defined within the cyclic motion may be used. For example, in trials conducted to-date, a DCP defined at 315° through the peak-to-peak oscillatory cycle along the major displacement axis (typically vertical "z") was used. This corresponds to 135° in the zero-to-peak cycle. The selection of the DCP, as in this example, preferably ensures that the displacement, velocity, acceleration and time-derivative of acceleration are all non-zero at the sampling point, at least along the primary displacement axis. Depending upon the sensor capabilities, synchronization of the DCP may be achieved automatically by appropriate configuration of the sensor, or via data pre-processing subsequent to sampling at a predetermined sampling frequency falling at arbitrary points in the vibration cycle.

It should be noted that the present invention is applicable to a wide range of types of vehicle, ranging from small cars through to large trucks, and correspondingly having various different numbers of wheels. For four-wheeled vehicles, all four wheels are preferably provided with their own vibratory sensor arrangements 14. In the case of vehicles having more than four wheels, road-handling performance monitoring can typically be achieved by monitoring only four wheels, preferably those nearest the outer corners of the vehicle. Even in such cases, deployment of sensor arrangements on each wheel may be preferred in order to offer the additional functions of detecting wheel-related faults, such as wheel imbalances, worn tread or wheel misalignment.

Data sampled by wheel vibratory sensor arrangements 14 is then passed to processing system 16. The data connection may be via hard-wired connection or via wireless telemetry (e.g., IR or RF communications links), depending upon practical engineering considerations and economic considerations for any given implementation.

Turning now to processing system 16 itself, this may be any suitable type of processing system including, but not limited to, a general-purpose processing system operating suitable software, purpose-built hardware, and any combination of hardware and software or "firmware". The use of onboard computer systems is already highly prevalent in automobile manufacture, and systems designed for implementing systems such as ESC may in some cases already have processing capacity sufficient for implementing the present invention.

Turning now to the processing architecture of processing system 16, which may be reflected either in hardware modules or in software modules, as is known in the art, this processing architecture may be implemented in numerous ways. Underlying the various options, is a common inventive concept, namely, that deteriorating driving conditions are identified by processing data from vibration measurements in at least two dimensions from each measured wheel. Three different approaches for implementing this common concept will now be addressed briefly.

According to a first approach, the vibrational data for each measured wheel is translated to the center of gravity of the vehicle, and the data is then treated as a single space curve in a multidimensional vector space, for example of 13 dimensions (3 dimensions of displacement, velocity and acceleration for each of four wheels plus time). It has been found empirically that the vector curvature of this multidimensional space curve is indicative of a current driving state of the vehicle, thereby allowing preparation of a look-up table or algorithm to translate the derived curvature into a current driving state classification.

Although the aforementioned first approach is particularly elegant in that it performs a single calculation in the multidimensional space of all measurements, this approach has been found computationally intensive, and is therefore difficult to implement in real-time and with high data sampling rates using compact and economical processing components. As a result, it has been found preferable to perform the computational analysis of sampled data as a two stage process. First, the vibrational motion measurements along each of the measured axes are processed for each wheel individually so as to derive, substantially in real time, at least one motion-related parameter for each wheel. Then, classification criteria are applied to the motion-related parameters for all of the wheels to identify a current status of vehicle function.

As a particularly simple implementation of this two-stage computational analysis, effective under a considerable range of circumstances, the vertical and horizontal vibration amplitudes may be compared against thresholds defined proportionally relative to the average amplitudes for each. This approach follows the intuitive explanation of the balance of vibrations as described above. Thus, during overly sharp high-speed cornering, thresholds for intervention might be set at a 30% decrease in vertical vibration amplitude relative to the mean value and a 60% increase in horizontal vibration amplitude on the outside wheels, and/or corresponding variations in the reverse direction on the inside wheels. The specific threshold values are empirically determined.

While this amplitude-based approach ties in well with the proposed intuitive explanation of the balance of vibrations described above, it suffers from a number of shortcomings. Most notably, the reliance on amplitude alone inherently disregards a large proportion of the information available from the vibratory sensor arrangements. To avoid this shortcoming, certain most preferred implementations of the present invention employ one, or more preferably two, parameters which quantify certain properties of the instantaneous motion of a reference point on each measured wheel. In particular, two properties which have been found highly effective for reliably determining the current status of the interaction between a vehicle wheel and the underlying surface are the vector curvature and the vector torsion of the space curve currently traveled by a reference point on each wheel.

Figure 3:
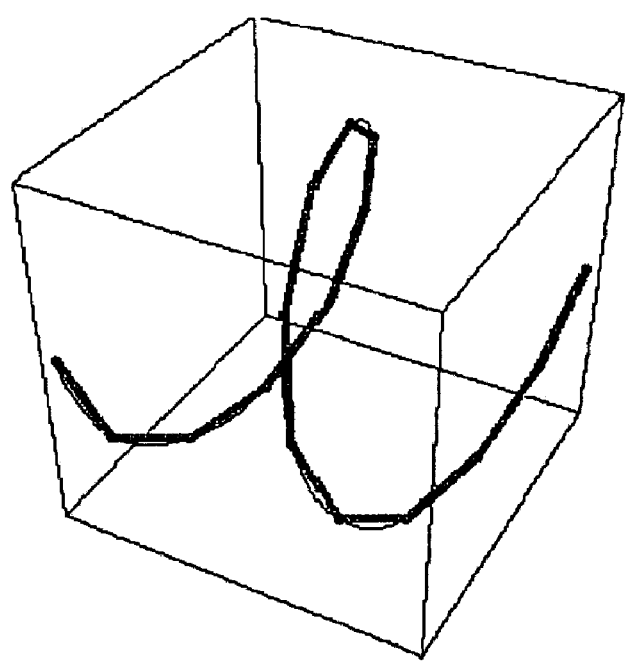
FIG. 3 is a schematic illustration of a part of a vibrational path of motion of a wheel hub as sampled by the system of the present invention.

Referring briefly to FIG. 3, this illustrates schematically an example of a possible path of motion of the reference point on one wheel during a fraction of a second as measured by the vibratory sensor arrangement. At each point along the path shown, the reference point has an instantaneous velocity v which is a tangent to the path. In the case of a circuitous path, the reference point also has an acceleration directed towards the center of the instantaneous curvature. In the case of a path as shown which exhibits momentary helical progression, the derivative of the acceleration with time has a component in the direction of helical progression. Each of these parameters is sampled by, or can readily be derived from, the vibratory sensor assembly associated with the wheel, and is typically provided in terms of components parallel to the x, y, z coordinate frame defined above.

General definitions of the vector curvature and vector torsion were given above in the "Background" section. These definitions may be rewritten in a standard manner using the components of the vectors, expressing the vector products and triple products using matrix determinant notation as follows:

$$\kappa = \frac{\left\| \begin{matrix} x & y & z \\ v_x & v_y & v_z \\ a_x & a_y & a_z \end{matrix} \right\|}{\left| \sqrt{v_x^2 + v_y^2 + v_z^2} \right|^3} \text{ and } \tau = \frac{\left\| \begin{matrix} v_x & v_y & v_z \\ a_x & a_y & a_z \\ a'_x & a'_y & a'_z \end{matrix} \right\|}{\left\| \begin{matrix} x & y & z \\ v_x & v_y & v_z \\ a_x & a_y & a_z \end{matrix} \right\|^2}$$

wherein x, y, z are unit vectors parallel to the corresponding axes;

the sampled velocity v has components $(v_x, v_y, v_z)$;

the sampled acceleration a has components $(a_x, a_y, a_z)$; and the time derivative of acceleration a' has components $(a'_x, a'_y, a'_z)$.

Since all of these components are either directly output from the vibratory sensor arrangements 14 or may be simply derived from those outputs, these formulae allow straightforward calculation of values for curvature and torsion from the sensor outputs with a low computational overhead readily implemented in real-time.

It has been found empirically that monitoring proportional changes from average values for each of curvature and torsion provide a highly reliable and robust tool for classifying the interaction between a wheel and the underlying surface. For example, increased load on a wheel (e.g., outside wheel during cornering or front wheel during braking) leads to an increase in curvature and a decrease in torsion, and conversely a reduced load leads to decreased curvature and increased torsion. When these deviations from normal/average values reach certain values, they become indicative of impending loss of vehicle control. Preferably, a less extreme threshold value for each parameter is used for classification purposes in order to provide a predictive warning that a potentially hazardous scenario is developing and to allow timely corrective action.

More specifically, it has been found useful for purposes of classifying different scenarios to define both an upper (increase) threshold and a lower (decrease) threshold for each parameter, and most preferably two levels of threshold for both increase and decrease of each parameter. Thus, each parameter may be classified as: normal, high, very high, low, or very low. For convenience of notation, these classifications may be identified as levels or "quantum changes" as follows: normal (0), high (+1), very high (+2), low (−1), and very low (−2). From experimental evidence to-date, it has been found that first thresholds in the range of 40%-60% increase or decrease, and particularly around 50%, are particularly useful. Similarly, it has been found that second (more extreme) thresholds in the range of 70%-90% increase or decrease, and particularly around 80%, are particularly useful.

It follows that the parameters generated by processing data from each DCP according to this exemplary implementation and in a case of a four-wheeled vehicle may be represented as eight integers between −2 and +2 corresponding to the "relative levels" of curvature and torsion for each of the four wheels. As long as all values are "0", i.e., within normal operating ranges, no intervention is required. When values outside the first upper or lower threshold ranges are obtained, these eight parameters provide a basis for classification of the current scenario, typically according to either preprogrammed algorithms or a look-up table, and implementation of suitable warning or corrective action.

By way of one non-limiting example, FIGS. 5A-5C illustrate schematically a look-up table which may be used to identify various malfunction states of a vehicle during operation. In each case, the state is identified by subgroup of wheels exhibiting the given abnormal values, the combination of values obtained, and in some cases, the time variance or constancy of the values. The values illustrated for curvature $\kappa$ and torsion $\tau$ are the "level" identifiers as defined above, in the range of −2 to +2. Each case specifies the suspected cause of the abnormal measurements, and the preferred course of action in the form of immediate intervention and/or recommendations to the driver or service staff as appropriate.

Figure 4:
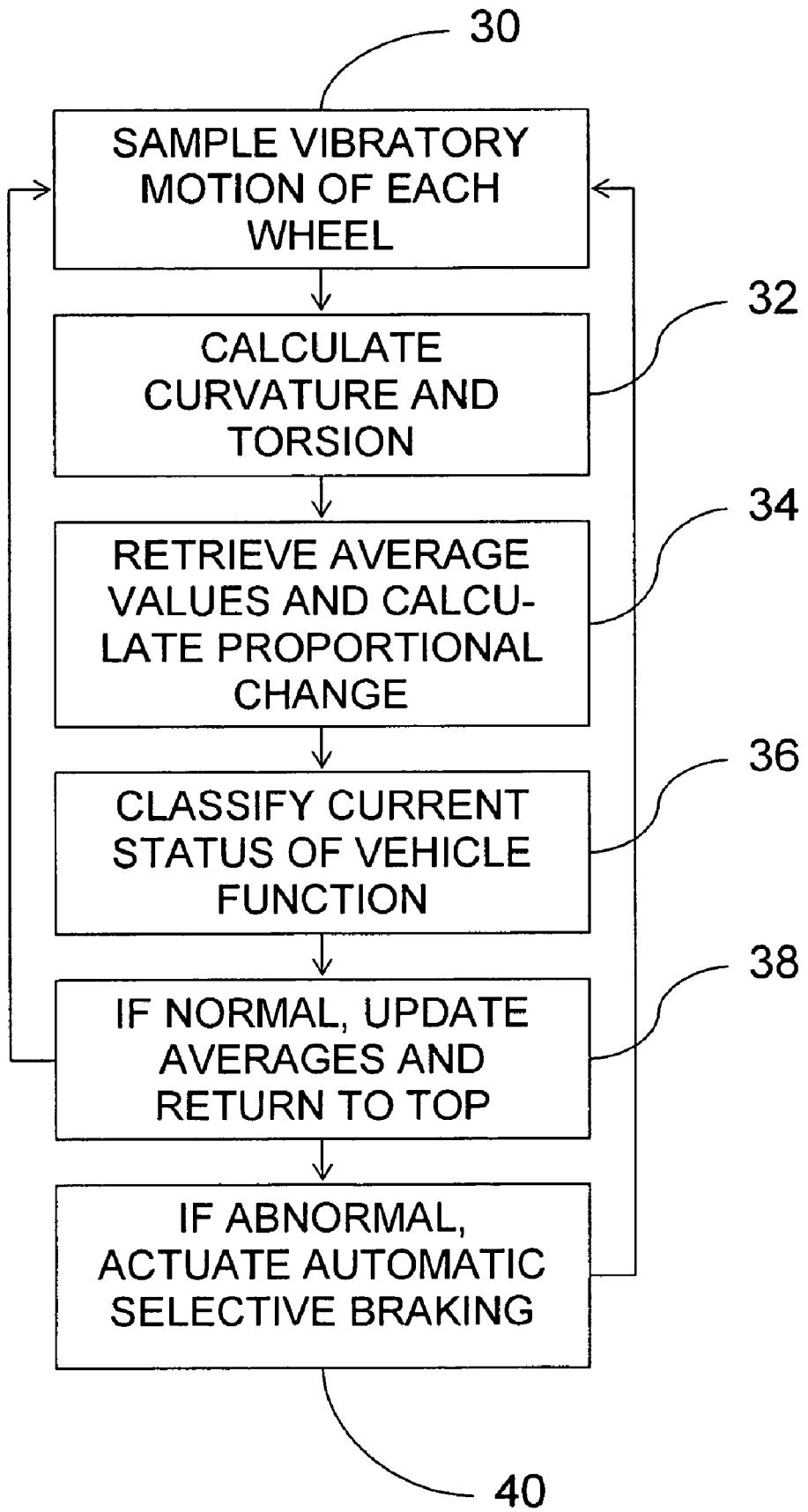
FIG. 4 is a flow chart illustrating schematically the operation of an exemplary implementation of the present invention.

At this stage, the operation of system 10, corresponding to the method of the present invention, will be clear. Referring to FIG. 4, at step 30 the system samples the vibratory motion for each monitored wheel, and then processes the sampled data. In the preferred case shown here, the processing includes calculating two parameters, specifically the curvature and torsion (step 32), comparing these values to average or pre-stored expected values and calculating a proportional change (step 34). These proportional changes are then used to classify a current status of the vehicle function (step 36), most preferably by applying threshold criteria to the changes and then applying algorithms or look-up tables to determine the current status. When the values are within normal ranges, the average values are optionally updated (step 38) and the monitoring process repeats from step 30. If abnormal conditions are identified, the system actuates automatic selective braking (step 40) or takes other suitable action. In the case of braking, the vehicle brake system is actuated to bring parameters back within safe limits and preferably also to enforce a calculated maximum safe speed.

EXAMPLE

At DCP, the values of velocity and acceleration of vibrations along longitudinal, transverse and vertical for are Front Right Wheel
  Velocity (x)=0.0361299
  Velocity (y)=0.029545
  Velocity (z)=0.0742197
  Acceleration (x)=0.00094975
  Acceleration (y)=0.00143623
  Acceleration (z)=0.00138715
  Derivative of acceleration (x)=0.000712
  Derivative of acceleration (y)=0.00158232
  Derivative of acceleration (z)=0.000592

$$\text{Curvature} = \frac{\begin{vmatrix} x & y & z \\ 0.0361299 & 0.029545 & 0.0742197 \\ 0.00094975 & 0.00143623 & 0.00138715 \end{vmatrix}}{\left|\sqrt{0.0361299\ ^2 + 0.029545\ ^2 + 0.0742197\ ^2}\right|^3}$$

Curvature=0.1079133620

$$\text{Torsion} = \frac{\begin{vmatrix} 0.0361299 & 0.029545 & 0.0742197 \\ 0.00094975 & 0.00143623 & 0.00138715 \\ 0.000712 & 0.00158232 & 0.000592 \end{vmatrix}}{\begin{vmatrix} x & y & z \\ 0.0361299 & 0.029545 & 0.0742197 \\ 0.00094975 & 0.00143623 & 0.00138715 \end{vmatrix}^2}$$

Torsion=0.0793359665
Average Curvature=0.2180802397
Average Torsion=0.1746612365
The percentage difference between curvature and average curvature is given by $^{(C-AC)}/AC*^{100}$=−50.51667 i.e. Low
The percentage difference between torsion and average torsion is given by $^{(T-AT)}/AT*^{100}$=−54.57723 i.e. Low Front Left Wheel
  Velocity (x)=0.1531569
  Velocity (y)=0.06180523
  Velocity (z)=0.1798801
  Acceleration (x)=0.000301166
  Acceleration (y)=0.00701622
  Acceleration (z)=0.00305532
  Derivative of acceleration (x)=0.0002112
  Derivative of acceleration (y)=0.00198112
  Derivative of acceleration (z)=0.0008916944
  Calculating the matrix formulae as before gives:
  Curvature=0.1072234463
  Torsion=0.0792064760
  Average Curvature=0.2180802397
  Average Torsion=0.1746612365
  Percentage change in curvature=−50.83302987 i.e. Low
  Percentage change in torsion=−54.65137107 i.e. Low Rear Right Wheel
  Velocity (x)=0.2207165
  Velocity (y)=0.0669311
  Velocity (z)=0.17
  Acceleration (x)=0.000515644
  Acceleration (y)=0.00653633
  Acceleration (z)=0.00968345
  Derivative of acceleration (x)=0.000800672
  Derivative of acceleration (y)=0.00076896
  Derivative of acceleration (z)=0.001632
  Calculating the matrix formulae as before gives:
  Curvature=0.1075362292
  Torsion=0.0795573662
  Average Curvature=0.2180802397
  Average Torsion=0.1746612365
  Percentage change in curvature=−50.68960426 i.e. Low
  Percentage change in torsion=−54.45047353 i.e. Low Rear Left Wheel
  Velocity (x)=0.0485634
  Velocity (y)=0.105931
  Velocity (z)=0.0793662
  Acceleration (x)=0.00027004
  Acceleration (y)=0.00305029
  Acceleration (z)=0.0042401999
  Derivative of acceleration (x)=0.0003648672
  Derivative of acceleration (y)=0.000785304
  Derivative of acceleration (z)=0.0006312
  Calculating the matrix formulae as before gives:
  Curvature=0.1077510154
  Torsion=0.0796132520
  Average Curvature=0.2180802397

Average Torsion=0.1746612365
Percentage change in curvature=−50.59111476 i.e. Low
Percentage change in torsion=−54.41847683 i.e. Low Thus, in this example, all four wheels are currently exhibiting a first level decrease (−1) in both curvature and torsion. This corresponds to Case "1" in FIG. 5A and indicates an onset of deterioration in the road holding capability of a specific tire of automobile due to slippery road conditions like wet/icy roads. In this example, road holding capability of all the four tires is at the onset of deterioration. If this situation worsens then the automobile will skid on braking or even hydroplane at higher speeds. Hence the system of the present invention would immediately apply brake pressure to reduce wheel rotations till vehicle comes under a Safe Speed condition sufficient to return the curvature and torsion values back to their "normal" ranges (level "0"). Whatever may be the tire, road and weather conditions, the system will intervene prior to drastic deterioration in order to avoid vehicle skidding.

It will be appreciated that the above descriptions are intended only to serve as examples, and that many other embodiments are possible within the scope of the present invention as defined in the appended claims.

What is claimed is:

1. A method for preventing skidding or roll-over of a road vehicle having at least four wheels during operation of the vehicle, the method comprising:
   (a) repeatedly measuring wheel-hub vibrational motion at the hub of each of at least four of the wheels;
   (b) processing the vibrational motion measurements to determine a current status of vehicle function; and
   (c) implementing a driving correction regime according to said current status of vehicle function,
   wherein said measuring and said processing measure and process the vibrational motion for each wheel along at least two perpendicular axes.

2. The method of claim 1, wherein the vibrational motion is measured along three perpendicular axes.

3. The method of claim 2, wherein said processing includes:
   (a) processing the vibrational motion measurements along each of said at least two axes for each wheel to derive, substantially in real time, at least one motion-related parameter for each wheel; and
   (b) applying classification criteria to values of said at least one motion-related parameter for all of the wheels to identify a current status of vehicle function.

4. The method of claim 3, wherein said at least one motion-related parameter for each wheel includes a parameter which varies as a function of a balance between vertical vibrations and horizontal vibrations of the wheel hub.

5. The method of claim 3, wherein said at least one motion-related parameter for each wheel includes a proportional deviation of the vector curvature of the wheel-hub vibrational motion.

6. The method of claim 5, wherein said proportional change is evaluated relative to an average value of vector curvature.

7. The method of claim 3, wherein said at least one motion-related parameter for each wheel includes a proportional deviation of the vector torsion of the wheel-hub vibrational motion.

8. The method of claim 7, wherein said proportional change is evaluated relative to an average value of vector torsion.

9. The method of claim 3, wherein said at least one motion-related parameter for each wheel includes:
   (a) a proportional deviation of the vector curvature of the wheel-hub vibrational motion; and
   (b) a proportional deviation of the vector torsion of the wheel-hub vibrational motion.

10. The method of claim 9, wherein said proportional changes are evaluated relative to an average value for each of said vector curvature and said vector torsion.

11. The method of claim 3, wherein said classification criteria include applying both an upper threshold and a lower threshold to said at least one motion-related parameter for each wheel.

12. The method of claim 1, wherein said driving correction regime includes automatic application of braking to selected wheels in order to return the current status of vehicle function to within predetermined limits.

13. A system for preventing skidding or roll-over of a road vehicle having at least four wheels during operation of the vehicle, the system comprising:
   (a) a wheel vibratory sensor arrangement associated with each of at least four of the wheels, said wheel vibratory sensor arrangement being configured to measure vibrational motion of the hub of each wheel along at least two perpendicular axes;
   (b) a processing system in data communication with each of said wheel vibratory sensor arrangements, said processing system being configured to process the vibrational motion measurements to determine a current status of vehicle function; and
   (c) a driving correction system associated with said processing system and responsive to said current status of vehicle function to implement a driving correction regime.

14. The system of claim 13, wherein said wheel vibratory motion sensor arrangement includes a tri-axial accelerometer associated with each of said at least four wheels and deployed for measuring vibrational motion of the hub of each wheel along three perpendicular axes.

15. The system of claim 13, wherein said driving correction system is associated with a brake system of the vehicle and is operative to apply braking to selected wheels of the vehicle.

* * * * *